United States Patent [19]

Egashira

[11] Patent Number: 6,014,519

[45] Date of Patent: Jan. 11, 2000

[54] LANGUAGE PROCESSING UNIT AND A LANGUAGE PROCESSING METHOD TO TRANSLATE A SOURCE PROGRAM AND GENERATE AN OBJECT MODULE FILE

[75] Inventor: Roh Egashira, Tokyo, Japan

[73] Assignee: NEC Corporation, Tokyo, Japan

[21] Appl. No.: 08/914,856

[22] Filed: Aug. 19, 1997

[30] Foreign Application Priority Data

Aug. 19, 1996 [JP] Japan .................................... 8-237211

[51] Int. Cl.⁷ ....................................................... G06F 9/45
[52] U.S. Cl. ........................... 395/709; 395/705; 395/707; 710/58
[58] Field of Search .................................... 395/702, 705, 395/706, 707, 709, 703; 364/551.01, 243.3, 264.4, 148.01; 710/58

[56] References Cited

U.S. PATENT DOCUMENTS

| | | | |
|---|---|---|---|
| 5,450,588 | 9/1995 | Hoxey | 375/500 |
| 5,586,020 | 12/1996 | Isozaki | 395/707 |
| 5,734,908 | 3/1998 | Chan et al. | 395/709 |
| 5,740,443 | 4/1998 | Carini | 395/707 |
| 5,764,686 | 6/1998 | Sanderford et al. | 375/200 |
| 5,787,285 | 7/1998 | Lanning | 395/704 |
| 5,842,017 | 11/1998 | Hookway et al. | 395/707 |

FOREIGN PATENT DOCUMENTS

| | | |
|---|---|---|
| 10173134 | 7/1989 | Japan . |
| 2-133825 | 5/1990 | Japan . |
| 7-234790 | 9/1995 | Japan . |

OTHER PUBLICATIONS

Holzle et al., "Optimizing dynamically dispatched calls with run time type feedback", ACM SIGPLAN, pp. 326–339, Jun. 1994.

Agrawal et al., "Compiler and runtime support for structured and block structred applications", ACM, pp. 578–587, Apr. 1993.

Hiranandani et al, "Compilation techniques for block cyclic distributions", ACM ICS, pp. 392–403, Jul. 1994.

Dwarkadas et al., "An integrated compile time/run time software distributed shared memory system", ACM ASPLOS VII, pp. 186–197, Jul. 1996.

Lefurgy et al., "Improving code density using compression techniques", IEEE, pp. 194–203, 1997.

Danzig et al., "A case for caching file objects inside internetwork", SIGCOMM'93 ACM, pp. 239–248, Sep. 1993.

Karpovich et al., Extensible file system: An object oriented approach to high performance file I/O., OOPSLA 94 ACM, pp. 191–204, Oct. 1994.

"Microsoft C Optimizing Compiler User's Guide" (by Microsoft in 1988).

*Primary Examiner*—Tariq R. Hafiz
*Assistant Examiner*—Anil Khatri
*Attorney, Agent, or Firm*—Scully, Scott, Murphy & Presser

[57] ABSTRACT

A language processing unit comprising a syntax analyzing portion to input and analyze a source program, a code pattern registering portion, a code generating portion to generate operation codes to an analysis results by the syntax analyzing portion according to the selection results by a code size measuring portion and a code pattern selecting portion (15), and a code pattern selecting portion (15) to appropriately replace the generating codes with priority on execution time with generating codes with priority on making the size small, and an object module file output portion to output generated operation codes as an object module file.

12 Claims, 10 Drawing Sheets

FIG. 4

| REGISTERED NUMBER | CODE PATTERN WITH PRIORITY ON CODE SIZE | CODE PATTERN WITH PRIORITY ON EXECUTION TIME | CODE SIZE DIFFERENCE | PATTERN USE FREQUENCY |
|---|---|---|---|---|
| 1 | 1A | 1B | D[1] | CNT[1] |
| 2 | 2A | 2B | D[2] | CNT[2] |
| ⋮ | ⋮ | ⋮ | ⋮ | ⋮ |
| n | nA | nB | D[n] | CNT[n] |

FIG. 5

| REGISTERED NUMBER | CODE PATTERN WITH PRIORITY ON CODE SIZE | CODE PATTERN WITH PRIORITY ON EXECUTION TIME | CODE SIZE DIFFERENCE | PATTERN USE FREQUENCY |
|---|---|---|---|---|
| 1 | 1A (2byte,6clock) | 1B (3byte,4clock) | 1byte | 22 |
| 2 | 2A (4byte,9clock) | 2B (6byte,6clock) | 2byte | 26 |
| 3 | 3A (3byte,9clock) | 3B (4byte,5clock) | 1byte | 34 |
| 4 | 4A (5byte,8clock) | 4B (7byte,7clock) | 2byte | 52 |
| 5 | 5A (2byte,8clock) | 5B (5byte,5clock) | 3byte | 40 |
| 6 | 6A (3byte,7clock) | 6B (4byte,6clock) | 1byte | 68 |

FIG. 8

| REGISTERED NUMBER | CODE PATTERN WITH PRIORITY ON CODE SIZE | CODE PATTERN WITH PRIORITY ON EXECUTION TIME | CODE SIZE DIFFERENCE | EXECUTION TIME DIFFERENCE | PATTERN USE FREQUENCY |
|---|---|---|---|---|---|
| 1 | 1A | 1B | D[1] | C[1] | CNT[1] |
| 2 | 2A | 2B | D[2] | C[2] | CNT[2] |
| ...... | ...... | ...... | ...... | ...... | ...... |
| n | nA | nB | D[n] | C[n] | CNT[n] |

FIG. 9

| REGISTERED NUMBER | CODE PATTERN WITH PRIORITY ON CODE SIZE | CODE PATTERN WITH PRIORITY ON EXECUTION TIME | CODE SIZE DIFFERENCE | EXECUTION TIME DIFFERENCE | PATTERN USE FREQUENCY |
|---|---|---|---|---|---|
| 1 | 1A (5byte,8clock) | 1B (7byte,7clock) | 2byte | 1clock | 52 |
| 2 | 2A (3byte,7clock) | 2B (4byte,6clock) | 1byte | 1clock | 68 |
| 3 | 3A (2byte,8clock) | 3B (5byte,5clock) | 3byte | 3clock | 40 |
| 4 | 4A (2byte,6clock) | 4B (6byte,6clock) | 1byte | 2clock | 22 |
| 5 | 5A (4byte,9clock) | 5B (6byte,6clock) | 2byte | 3clock | 26 |
| 6 | 6A (3byte,9clock) | 6B (4byte,5clock) | 1byte | 4clock | 34 |

LANGUAGE PROCESSING UNIT AND A LANGUAGE PROCESSING METHOD TO TRANSLATE A SOURCE PROGRAM AND GENERATE AN OBJECT MODULE FILE

BACKGROUND OF THE INVENTION

1. Field of the Invention

The present invention relates to a language processing unit and a language processing method to translate a source program and generate an object module file. More specifically, the present invention relates to a language processing unit and a language processing method that enable to generate an object module file with a shorter execution time in a range of code size designated by a programmer.

2. Description of the Related Art

A file that a language processing program translates an input source program and generates as its result is called an object module file.

In micro computers, especially in single chip micro computers, restrictions in their performance are apt to increase in number for the purpose of cost reduction. Therefore, in a language processing program, it is desired that the execution time of an object module file as a result of language processing (hereinafter simply referred to as "execution time") should be short, and the size of an object module file (hereinafter simply referred to as "code size") should be small.

However, in the conventional language processing units according to the prior art, an object module file has been output through optimization in which emphasis is put on either code size or execution time to an input source program.

As one of the above prior art, there has been a technology that was disclosed in, for example, the document "Microsoft C Optimizing Compiler User's Guide" (by Microsoft in 1988). In the document, described is a technology to generate an output code by selecting either an output with priority on the code size of an object module file or an output with priority on the execution time of an object module file by option at the execution of a language processing unit.

FIG. 10 shows a structure of a conventional language processing unit according to the prior art.

In FIG. 10, a language processing unit 82 analyzes an input source program file 81 by a syntax analyzing portion 83 thereof. After the completion of syntax analysis, control is transferred to a code generating portion 84, a command is selected on the basis of the analyzed results and the designation of a programmer, and thereby an output code is generated. After the completion of code generation, control is transferred to an object module file output portion 85, and an object module file 86 is output.

In the code generating portion 84, when the language processing unit 82 can generate plural output code patterns and can select any of the output code patterns, the selection of output code pattern is made by the choice of a programmer. Namely, when an output with priority on code size is designated, control is transferred to a code size priority code generating portion 841, and code generation is carried out so that a code size should be small.

In the code size priority code generating portion 841, priority is put on the reduction of code size rather than the improvement of execution time, the execution time of a generated object module file may become slow. On the other hand, when a programmer designates an output with priority on execution time, control is transferred to the execution time priority code generating portion 842, and code generation is made so that the execution time should become short. In the execution time priority code generating portion 842, priority is put on the improvement of execution time rather than the reduction of code size, therefore, the code size may increase.

In the next place, the algorithm of the conventional processing according to the prior art is explained in reference to FIG. 11 hereinafter.

In the conventional language processing method, first, the syntax analysis of a source program file that a programmer has input (step 901). Then, whether a programmer has designated the priority on code size, or whether he has designated the priority on execution time (step 902), and in the case of designation of the priority on code size, an output code is generated at a portion where plural output code patterns can be selected in code generation (Step 903). On the other hand, in the case of the priority on execution time, an output code is generated at a portion where plural code generations output code patterns can be selected in code generation (step 904). And after the completion of an output code, an object module file is output (Step 905).

However, in the conventional language processing technology described above, when a programmer wants both the reduction of code size and the improvement of execution time at one time to an object module file, it was difficult to output an object module file enough to meet the requirements of a programmer to both code size and execution time, which has been a problem with the conventional technology. This was because, in the above conventional technology, a programmer could only select whether the priority on the reduction of code size or the priority on the improvement of execution time, and in the designation of the priority on code size, execution time may become slow, while in the designation of the priority on execution time, code size may become large. Both the code size and the execution time depend on a operation code, however, there is not always the smallest and fastest command. Accordingly, when code size is made smallest, execution time may become slow, on the contrary, when execution time is made shortest, then code size may become large, which has been a problem with the conventional technology according to the prior art.

SUMMARY OF THE INVENTION

Accordingly, one object of the present invention is to provide a language processing unit and a language processing method that enable to generate an object module file with a shorter execution time in a range of code size designated by a programmer.

Another object of the present invention is to provide a language processing unit and a language processing method that enable for a programmer to freely decide the code size of an object module file by a programmer himself.

According to the first aspect of the invention, a language processing unit for translating a source program into an object module file, comprises syntax analysis means for inputting and analyzing a source program, code pattern registering means for registering code generation methods and code size differences about different code patterns in the case of generating code to put priority on making the size of an object module file small, and in the case of generating code to put priority on making the execution time short, code size measuring means for measuring the size of an object module file in the case of code generation with priority on making the size of an object module file small, and the size of an object module file in the case of code generation with priority on making the execution time short, and counting the times of each pattern of said output codes registered in said code pattern registering means in generated operation codes, code pattern selecting means for replacing part or the whole of said generating codes with priority on the execution time of an object module file with generating codes with priority on the size of an object module file so that they should be stored within the code size of an object module file designated by a programmer in reference to the measurement results of said code size measuring means and said registered contents of said code pattern registering means, code generation means for generating an operation code to an analysis results by said syntax analysis means, in accordance with said selection results of said code pattern selecting means, object module file output means for outputting said operation code generated by said code generation means as an object module file.

In the preferred construction, the code pattern registering means may register code patterns in the order so as to restrict the deterioration in the execution time of an object module file and make the size of an object module file smaller, and the code pattern selecting means may decide the times of code generation with priority on the size of an object module file, among the use frequencies of each code pattern.

According to the second aspect of the invention, a language processing method for translating a source program into an object module file, comprising the steps of:

inputting and analyze a source program, measuring the size of an object module file in the case of code generation with priority on making the size of an object module file small, and the size of an object module file in the case of code generation with priority on making the execution time short, to an analysis results by said source program analysis step, and counting the times of each pattern of said output codes registered among generated operation codes, selectively replacing part of the whole of said generating codes with priority on the execution time of an object module file with said generating codes with priority on the size of an object module file so that they should be stored within the code size of an object module file designated by a programmer in reference to the measurement results of said code size measuring step and said respective code generation methods and the data on code generation that are accumulated about different code patterns in the case with priority on making the size of an object module file small and in the case with priority on making the execution time of an object module file short, generating an operation code to said program analyzed by said source program analysis step according to said selection results by said generating code selection step, and outputting said operation code generated by said operation code generation step as an object module file.

In another preferred construction, the generating code selecting step refers the data accumulated on said code pattern in the order so as to restrict deterioration in the execution time of an object module file and make the size of an object module file smaller, and the generating code selecting step restricts the times of the code generation with priority on the size of an object module file, among the use frequencies of each code pattern.

According to the third aspect of the invention, a computer readable memory having a language processing program to control a language processing unit to translate a source program into an object module file, and said language processing program comprising the steps of:

inputting and analyze a source program, measuring the size of an object module file in the case of code generation with priority on making size of an object module file small, and the size of an object module file in the case of code generation with priority on making the execution time short, to an analysis results by said source program analysis step, and counting the times of each pattern of said output codes registered among generated operation codes, selectively replacing part of the whole of said generating codes with priority on the execution time of an object module file with said generating codes with priority on the size of an object module file so that they should be stored within the code size of an object module file designated by a programmer in reference to the measurement results of said code size measuring step and the respective code generation methods and the data on code generation that are accumulated about different code patterns in the case with priority on making the size of an object module file small and in the case with priority on making the execution time of an object module file short, generating an operation code to the program analyzed by said source program analysis step according to the selection results by said generating code selection step, and outputting the operation code generated by said operation code generation step as an object module file.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a diagram showing the registered contents of a code pattern registering portion in a language processing unit by the first preferred embodiment.

FIG. 5 is a diagram showing a concrete example of a code pattern registering portion in a language processing unit by the first preferred embodiment.

FIG. 8 is a diagram showing the registered contents of a code pattern registering portion in a language processing unit by the second preferred embodiment under the present invention.

FIG. 9 is a diagram showing a concrete example of a code pattern registering portion in a language processing unit by the second preferred embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
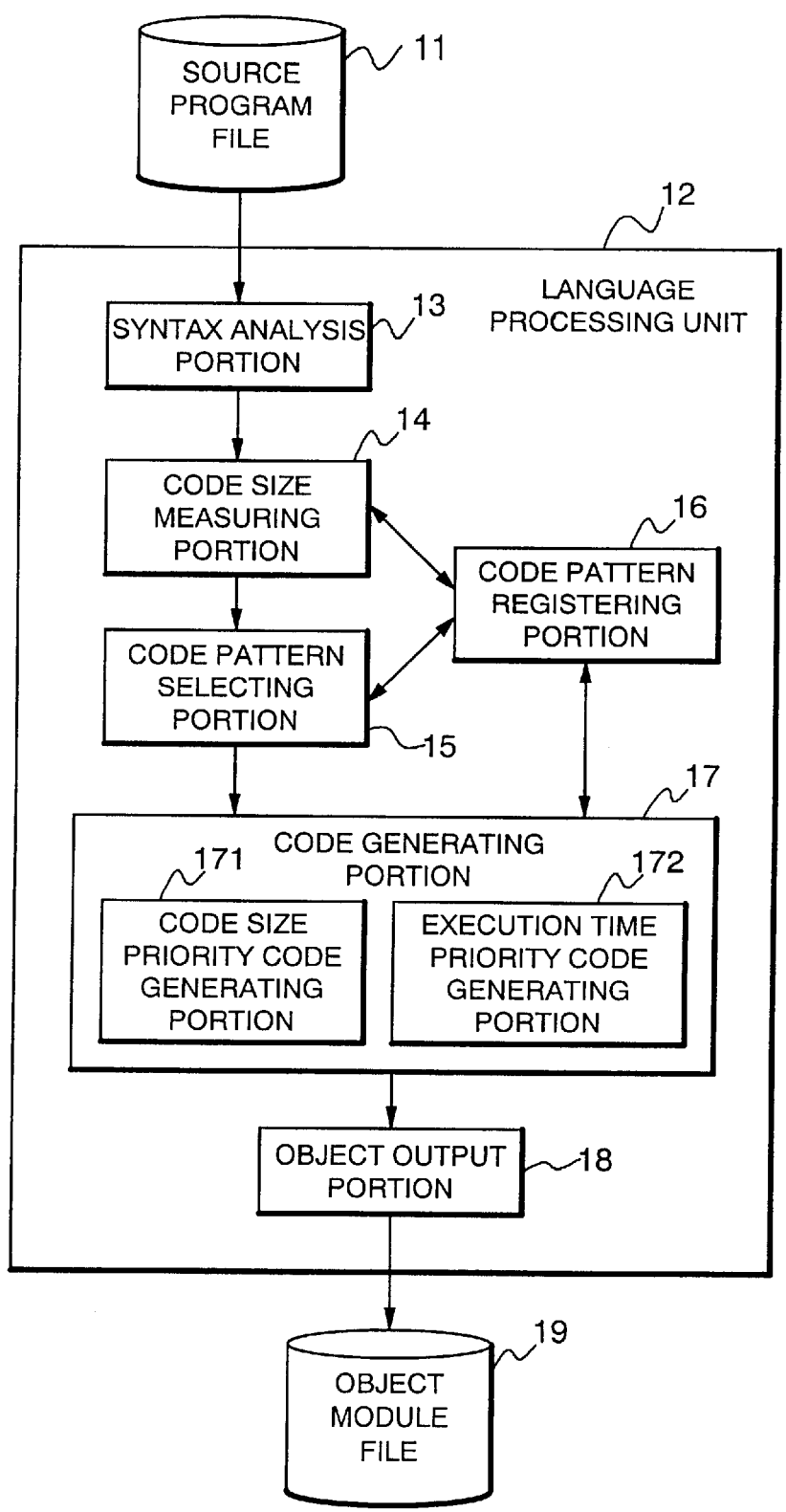
FIG. 1 is a block diagram showing the structure of a language processing unit according to the first preferred embodiment under the present invention.

FIG. 1 is a block diagram showing the structure of a language processing unit according to the first preferred embodiment under the present invention.

As shown in the figure, a language processing unit 12 is equipped with a syntax analyzing portion 13 that inputs a source program file 11 and analyzes the contents thereof, a code generating portion 17 that carries out code generation referring to basis of the results of the above syntax analysis, and an object module file output portion 18 that outputs a code generated by the code generating portion 17 as an object module file 19, a code pattern registering portion 16 wherein the data of code patterns whose output code varies with the case of the priority on code size and the case of the priority on execution time, a code size measuring portion 14 that measures a code size and measures the use frequency of code pattern registered in the code pattern registering portion 16, and code pattern selecting portion 15 that selects an output code pattern so as to make an output code within the codes size designated by a programmer. By the way, in FIG. 1, only a characteristic structure of the first preferred embodiment according to the present invention is shown, and other general structures are omitted herein.

In the above structure, a syntax analyzing portion 13, a code size measuring portion 14, a code pattern selecting portion 15, a code generating portion 17 and an object output portion 18 are realized by CPU, RAM and other internal memories that are controlled by a computer program. The computer program is stored in a magnetic disk, a semiconductor memory and other storage media and supplied, and loaded to the internal memory to control CPU, and thereby realizes the above respective executional portions. And the code pattern registering portion 16 is realized by a magnetic disk unit and other external storage units. By the way, the functions of the syntax analyzing portion 13 and the code generating portion 17 and the object module file output portion 18 are same as those in the conventional technology.

The code pattern registering portion 16 registers, as for the portion where code generation varies with the case of the priority on code size and the case of the priority on execution time, the difference between the code size and the code pattern in the case of the priority on code size, the code pattern in the case of the priority on execution time, the code pattern in the case of priority on code size and the code pattern in the case of priority of execution time. When the code size of an object module file varies with the case of priority on code size and the case of priority on execution time, there exists at least one code pattern that is registered in the code pattern registering portion 16, and there occurs a difference in generating code in the code pattern registered. At the event of a difference in generating code, there occurs a difference in an object module file in the case of priority on code size and that in the case of priority on execution time, and in general, the code size in the case of priority on execution time becomes larger.

The code size measuring portion 14 measures the code size of an object module file in the case of priority on code size, and the code size of an object module file in the case of priority on execution time. The measurement of code size may be available by a processing method similar to that for the code generating portion 17. Two measured code size values are used in the processing of the code pattern selecting portion 15.

And the code size measuring portion 14, in parallel with the code size measuring processing, counts how many times the code pattern registered in the code pattern registering portion 16 is used, and stores the use frequency of each code pattern into the code pattern registering portion 16. The use frequency of each code pattern stored in the code pattern registering portion 16 is used in the processing of the code pattern selecting portion 15.

The code pattern selecting portion 15 sets the data for each pattern stored in the code pattern registering portion 16 to select whether to carry out a code generation with priority on code size or carry out a code generation with priority on execution time. By reference to the set data, it is possible to replace part or the whole of the generating code of an object module file in the case with priority on execution time with the generating code in the case with priority on code size so that the code size should be contained within the code size designated by a programmer.

The code generating portion 17 carries out a code generation at the code size priority code generating portion 171 or the execution time priority code generating portion 172 according to the selection results by the code pattern selecting portion 15. The code size priority code generating portion 171 carries out a code generation so as make the code size small, while the execution time priority code generating portion 172 carries out a code generation so as make the execution time short. In the code generation at the code generating portion 17, intermingled are the code generation with priority on code size and the code generation with priority on execution time. After the completion of code generation, control is transferred to the object module file output portion 18, and an object module file is output.

In the next place, in reference to the flow charts shown in FIG. 2 and FIG. 3, the processing of this preferred embodiment will be explained in details hereinafter.

Figure 2:
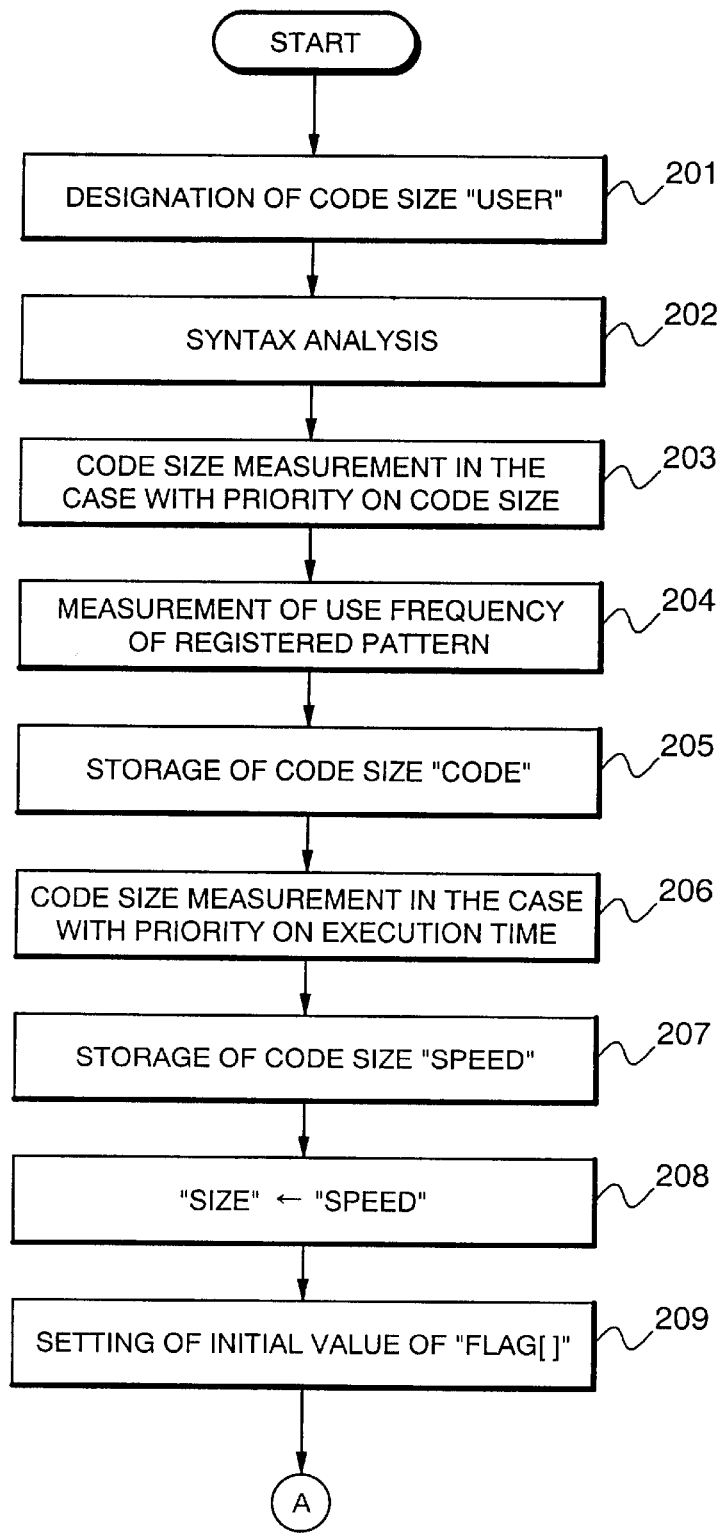
FIG. 2 is a flow chart showing actions from a code size measuring portion to a code generating portion by the first preferred embodiment.

First, a programmer designates a code size that he wants (FIG. 2, Step 201). The designated value is stored into an area specified on memory (hereinafter referred to as "USER").

When a programmer designates a code size that he wants, the syntax analyzing portion 13 carries out a syntax analysis on the contents of the source program file 11 (step 202). After the completion of the syntax analysis, the code size measuring portion 14 measures the code size of an object module file in the case with priority on code size (step 203). Along with the code size measuring process of the step 203, it measures the use frequency of the code pattern stored in the code pattern registering portion 16 (step 204).

FIG. 4 is an example of the registered contents of the code pattern registering portion 16. In the code pattern registering portion 16, generating codes 1A, 2A, . . . in the case with priority on code size, generating codes 1B, 2B, . . . in the case with priority on execution time, code size difference between generating code in the case with priority on code size and generating code in the case with priority on execution time D[1], D[2], . . . , and the use frequency of code pattern CNT[1], CNT[2], . . . are secured as areas on memory. As for the k-th code pattern, generating code kA in the case with priority on code size, generating code kB in the case with priority on execution time, and the code size difference D[k] between kA and kB are registered. ThekA and the kB have different generating codes, but they do same actions. The use frequency measured in the foregoing step 204 is set to the area CNT[k].

The code size obtained by the code size measurement of the step 203 is stored into an area on memory (hereinafter referred to as "CODE") (step 205).

After the completion of the step 205, the code size measuring portion 14 refers to the results of the syntax analysis at the syntax analyzing portion 11 once again, and measures the code size of an object module file in the case with priority on execution time (step 206). The code size obtained by the code size measurement in the step 206 is stored into an area on memory (hereinafter referred to as "SPEED") (step 207).

After the completion of the step 207, control is transferred to the code pattern selecting portion 15. First, the initial setting of the code size of an object module file to be output is carried out, and is stored into an area on memory (hereinafter referred to as "SIZE") (step 208). The initial setting value is the code size "SPEED" in the case with priority on execution time.

After the completion of the step 208, as for each code pattern registered in the code pattern registering portion 16, areas on memory FLAG[1], FLAG[2], . . . are initialized into "0" (step 209). The FLAG[1], FLAG[2], . . . mean the flags to judge whether to carry out a code generation with priority on code size or to carry out a code generation with priority on execution time. The FLAG[k] represents the flag as for the code pattern registered in the k-th of the code pattern registering portion 16. The FLAG[x] (x is the registered number) represents that the flag is down at the moment "0", and the flag is up at other moment than "0". In code generation, when the flag is up to each code pattern, a code generation with priority on code size is carried out, while if the flag is down, a code generation with priority on execution time is carried out. After the initialization of the FLAG[ ] in the step 209, the FLAG[ ] becomes all down, and if a code generation is carried out as it is, a code generation with priority on execution time is carried out in all the descriptions where plural code generations are available.

Figure 3:
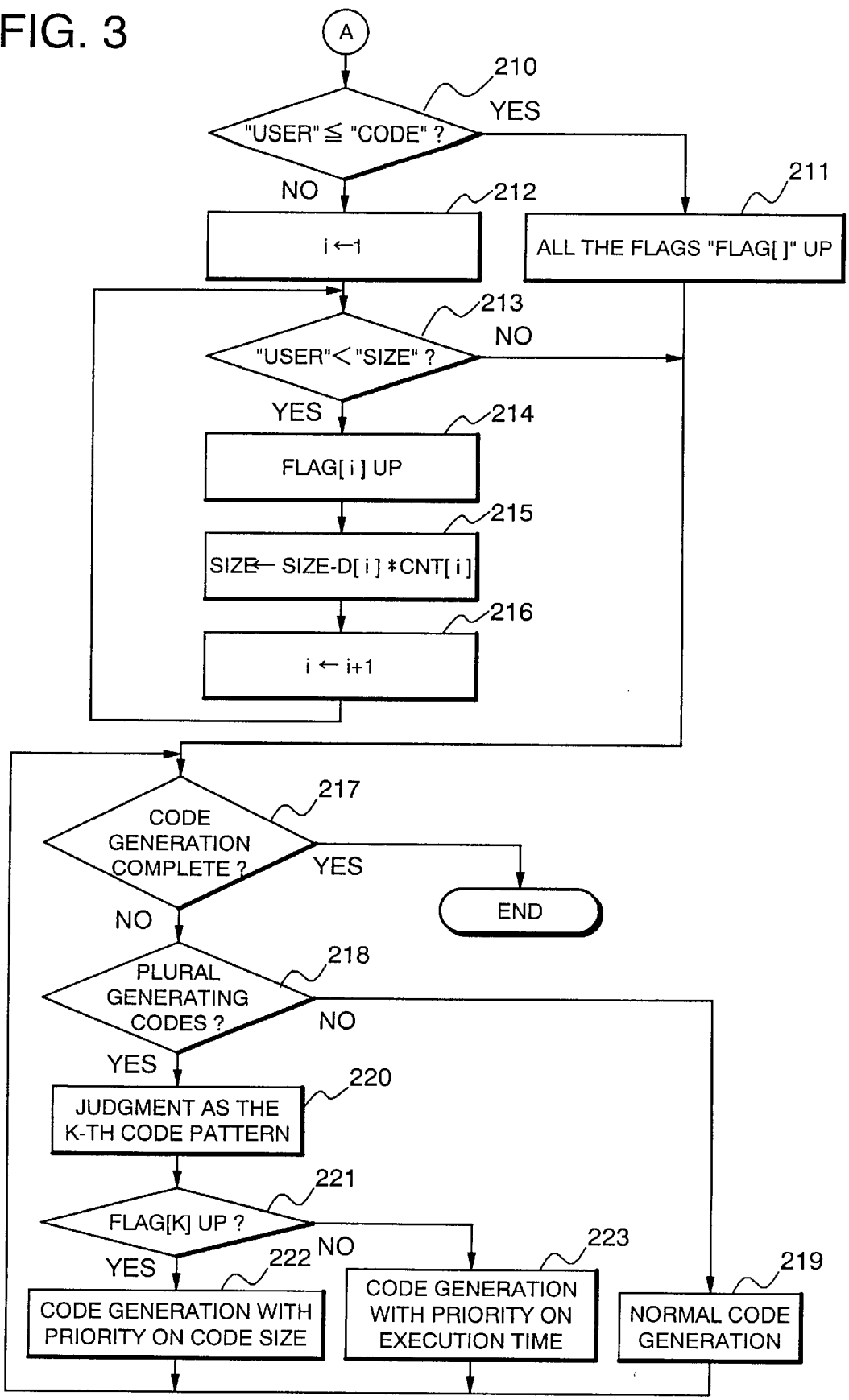
FIG. 3 is a flow chart showing actions from a code size measuring portion to a code generating portion by the first preferred embodiment.

After the completion of the initialization of the FLAG[ ] in the step 209, the code size designated by a programmer "USER" is compared with the code size in the case with priority on code size "CODE" (FIG. 3, step 210). When the code size designated by a programmer "USER" is below the code size in the case with priority on code size "CODE", the FLAG[1], FLAG[2], . . . to carry out the code generation with priority on code size are made all up (step 211), and control is transferred to the code generating portion 17, and the code generation processing in and after the step 217 is carried out.

In the step 210, when the code size designated by a programmer "USER" is larger than the code size in the case with priority on code size "CODE", the area on memory "i" to represent the registered number of the code size registered in the code pattern registering portion 16 is initialized into "1" (step 212), the code size designated by a programmer "USER" is compared with the code size of an objective module file to be output "SIZE" (Step 213). When the code size designated by a programmer "USER" is smaller than the code size of an object module file to be output "USER", the FLAG[i] is made up, and the code generation with priority on code size is carried out at all the use portions about the i-th code pattern registered in the code pattern registering portion 16 (step 214).

In the step 214, part of code generations change from the code generation with priority on execution time into the code generation with priority on code size, and thereby the code size of an object module file to be output is made smaller by the product of the code size difference registered in the i-th of the code pattern registering portion 16 and the use frequency CNT[i], so the value obtained by subtracting the product of the D[i] and the CNT[i] from the code size "SIZE" of an object module file to be output is reset as the code size "SIZE" of an object module file to be output (step 215).

After the completion of resetting of the code size "SIZE" of an object module file to be output in the step 215, "1" is added to the contents of the registered number "i" of the code pattern in the code pattern registering portion 16 (step 216), then the procedure gets back to the step 213, wherein comparison is carried out between the code size designated by a programmer "USER" and the code size of the object module file reset to be output "SIZE".

In the step 213, when the code size designated by a programmer "USER" is over the code size of the object module file to be output "SIZE", control is transferred to the code generating portion 17, and the code generation processing in and after the step 217 is carried out.

In the code generating portion 17, first, it is judged whether the code generation is completed or not (step 217). If the code generation is not completed, it is judged whether there are plural generating codes or not (step 218). This is same as the conventional processing. If there is only one generating code, a code generation is carried out in the same manner as the conventional method (step 219). If there are plural generating codes, their registration numbers in the code pattern registering portion 16 are judged (step 220). The registered number of the code pattern obtained in the step 220 is made as "k".

After this, it is judged whether the FLAG[k] is up to the code pattern registered in the k-th of the code pattern registering portion 16 (step 221). If the FLAG[k] is up, control is transferred to the code size priority code generating portion 171, and a code generation is carried out by the code pattern with priority on code size (step 222). And if the FLAG[k] is down, control is transferred to the execution time priority code generating portion 172, and a code generation is carried out by the code pattern with priority on execution time (step 223). After the code generation at the step 219, step 222, or step 223, the procedures gets back to the step 217, and it is judged whether the code generation is completed or not. When the code generation is not completed, the next code generation is carried out. When all the code generations are completed, control is transferred to the object module file output portion 18, and an object module file 19 is output.

The above processing is explained now with a concrete example. FIG. 5 is an example of the registered contents of the code pattern registering portion 16. As shown in the figure, in this example, the unit of code size is set as byte, the unit of execution time is set as clock, and it is supposed that six code patterns are registered. The use frequency of code patterns CNT[1], CNT[2], . . . are set in the process at the step 204.

With respect to a specified source program file, from the measurement of the code size in the code size measuring portion 14, it is supposed that the code size of an object module file designated by a programmer "USER" is 1500 bytes, and the code size of an object module file in the case with priority on code size "CODE" is 1200 bytes, and the code size of an object module file in the case with priority on execution time "SPEED" is 1600 bytes. And it is supposed that the use frequency of the code pattern registered in the code pattern registering portion 16 CNT[ ] is 22 times, 26 times, 34 times, 52 times, 40 times, and 68 times in the order of registered number.

Under the above conditions, in the step 208, the code size of an object module file to be output "ESIZE" is set to 1600 bytes in the same manner as the code size of the object module file in the case with priority on execution time "SPEED".

In the step 209, when there are plural generating codes, all the flags FLAG [x] (x is the registered number) to judge whether to carry out a code generation with priority on code size or not are initialized into "0".

In the comparison of the code size "USER" (1500 bytes) and the code size "CODE" (1200 bytes) in the step 210, the code size "USER" is larger than the code size "CODE", so the procedure gets to the step 212, and the area on memory "i" to represent the registered number of the code pattern of the code pattern registering portion 16 is initialized into "1".

In the comparison of the code size "USER" (1500 bytes) and the code size "SIZE" (1600 bytes) in the step 213, the code size "USER" is smaller than the code size "SIZE", so in the step 214, the FLAG[1] is made up. From FIG. 5, the code size difference D[1] is 1 bytes, and the code pattern use frequency CNT[1] is 22 times, so in the step 215, the code size "SIZE" is reduced by (1×22) byte and becomes 1578 bytes, and in the step 216, the registered number of code pattern "i" becomes "2".

At the completion of the process at the step 216, the procedure gets back to the step 213, and once again the comparison between the code size "USER" (1500 bytes) and the code size "SIZE" (1578 bytes) is carried out. The code size "SIZE" is larger than the code size "USER", so in the step 214, the FLAG[2] is made up. From FIG. 5, the code size difference D[2] is 2 bytes, and the code pattern use frequency CNT[2] is 26 times, so in the step 215, the code size "SIZE" is reduced by (2×26) and becomes 1526 bytes, and in the step 216, the code pattern registered number "i" becomes "3".

Back in the step 213, in the comparison between the code size "USER" (1500 bytes) and the code size "SIZE" (1526 bytes), the code size "SIZE" is larger than the code size "USER", so in the step 214, the FLAG[3] is made up. From FIG. 5, the code size difference D[3] is 1 byte, and the code pattern use frequency CNT[3] is 34 times, so in the 215, the code size "SIZE" is reduced by (1×34) and becomes 1492 bytes, and in the step 216, the code pattern registered number "i" becomes "4".

Back in the step 213, in the comparison between the code size "USER" (1500 bytes) and the code size "SIZE" (1492 bytes), the code size "SIZE" is below the code size "USER", so processing is transferred to the code generation in and after the step 217.

In the code generation, as for the code pattern registered in the code pattern registering portion 16, the FLAG[x] (x is the registered number) to the code patterns whose registered number is 1–3 is up, so the code generation with priority on code size is carried out, and the FLAGS[ ] to the code patterns whose registered number is 4~6 is down, so the code generation with priority on execution time is carried out. And after the completion all the code generations, an object module file is output.

The output object module file shows its code size as 1492 bytes, which meets the condition that the code size of programmer's desired object module file is below 1500 bytes. And since the code pattern with priority on execution time is included, the execution time becomes shorter than an object module file in the case with priority on code size.

In the next place, the second preferred embodiment according to the present invention is explained in details in reference to the drawings hereinafter.

In the above first preferred embodiment, whether the code generation with priority on code size or the code generation with priority on execution time is judged by whether the FLAG[ ] is up or not to each code pattern registered in the code pattern registering portion 16, and after decision, the same code generation is always carried out at a portion where the code pattern is used. And the code patterns registered in the first preferred embodiment have not any regulation on registration order, therefore, there is no consideration on the efficiency about the order to replace the code generation with priority on execution time with the code generation with priority on code size. But in the present preferred embodiment, two improvements have been made so as to carry out code generation to restrict the deterioration of execution time.

The first improvement is for each code pattern registered to have the priority order about the replacement of code generations. The second improvement is for each code pattern registered to have both the code generation with priority on code size and the code generation with priority on execution time, and thereby to limit the replacement of generating codes so as to make the size of an object module file to be output within the code size designated by a programmer.

The structure of a language processing unit according to the present preferred embodiment is similar to that of the language processing unit in the first preferred embodiment except for the items to be additionally registered in the code pattern registering portion 16, therefore, explanation for its whole structure is omitted herein.

FIG. 8 is the registered contents of the code pattern registering portion 16 in the present preferred embodiment. In the code pattern registering portion 16, in addition to the registered contents of the first preferred embodiment shown in FIG. 4, the execution time difference C[1], [2], . . . between the generating code with priority on execution time and the generating code with priority on code size are secured and registered as an area on memory. The C[k] represents the execution time difference between the generating code kA registered in the k-th of the code pattern registering portion 16 and the generating code kB.

In the first preferred embodiment, there is no regulation on the registration order of the code patterns registered in the code pattern registering portion 16, but, in the present preferred embodiment, priority order is given in the registration order, and code patterns with high priority are registered in order of priority. Code patterns with high priority mean ones which have little deterioration in execution time and are effective for the reduction of code size when they are replaced from the code generation with priority on execution time to the code generation with priority on code size. The value D[x]–C[x] (x is the registered number). that is obtained by subtracting the execution time difference C[x] ((x is the registered number) from the code size difference D[x] (x is the registered number) registered in the code pattern registering portion 16 is set as the priority standard, and code patterns with large value of D[x]–C[x] (x is the registered number) have priority, and as for those with the same value, code pattern having a smaller execution time difference C[x] (x is the registered number) has priority. By giving priority order, it is possible for the code pattern selecting portion 15 to carry out the replacement from the code generation with priority on execution time to the code generation with priority on code size in the order from patterns having little deterioration in execution time.

And further, in the present preferred embodiment, the processing of the code pattern selecting portion 15 differs from that in the above first preferred embodiment. Namely, in the first preferred embodiment, whether to carry out the code generation with priority on code size or to carry out the code generation with priority on execution time is judged by the flags FLAG[1], [2], . . . . While in the present preferred embodiment, the times to carry out the code generation with priority on code size is set to each code pattern registered in the code pattern registering portion 16, and the code generation with priority on code size is carried out for the set times, and for remaining times, the code generation with priority on execution time is carried out.

Figure 6:
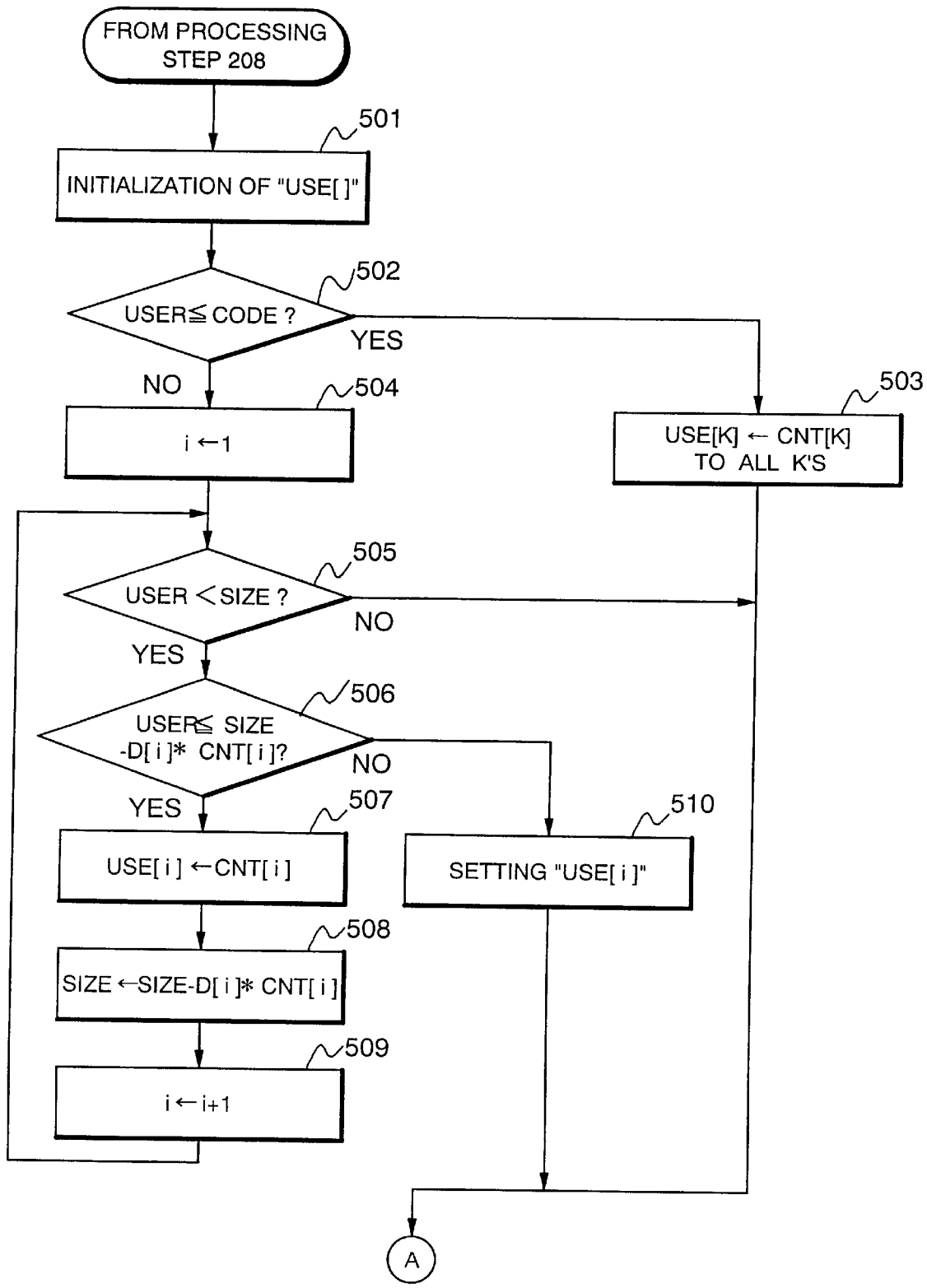
FIG. 6 is a flow chart showing actions from a code pattern selecting portion to a code generating portion by the second preferred embodiment under the present invention.

Hereinafter, the details of the processing in the present preferred embodiment is explained in reference to the flow charts in FIG. 6 and FIG. 7.

First, the processes up to the step 208 by the code pattern selecting portion 16 shown in FIG. 2 are carried out. The contents of the processes are same as in the first preferred embodiment, therefore, explanation is omitted herein.

Figure 7:
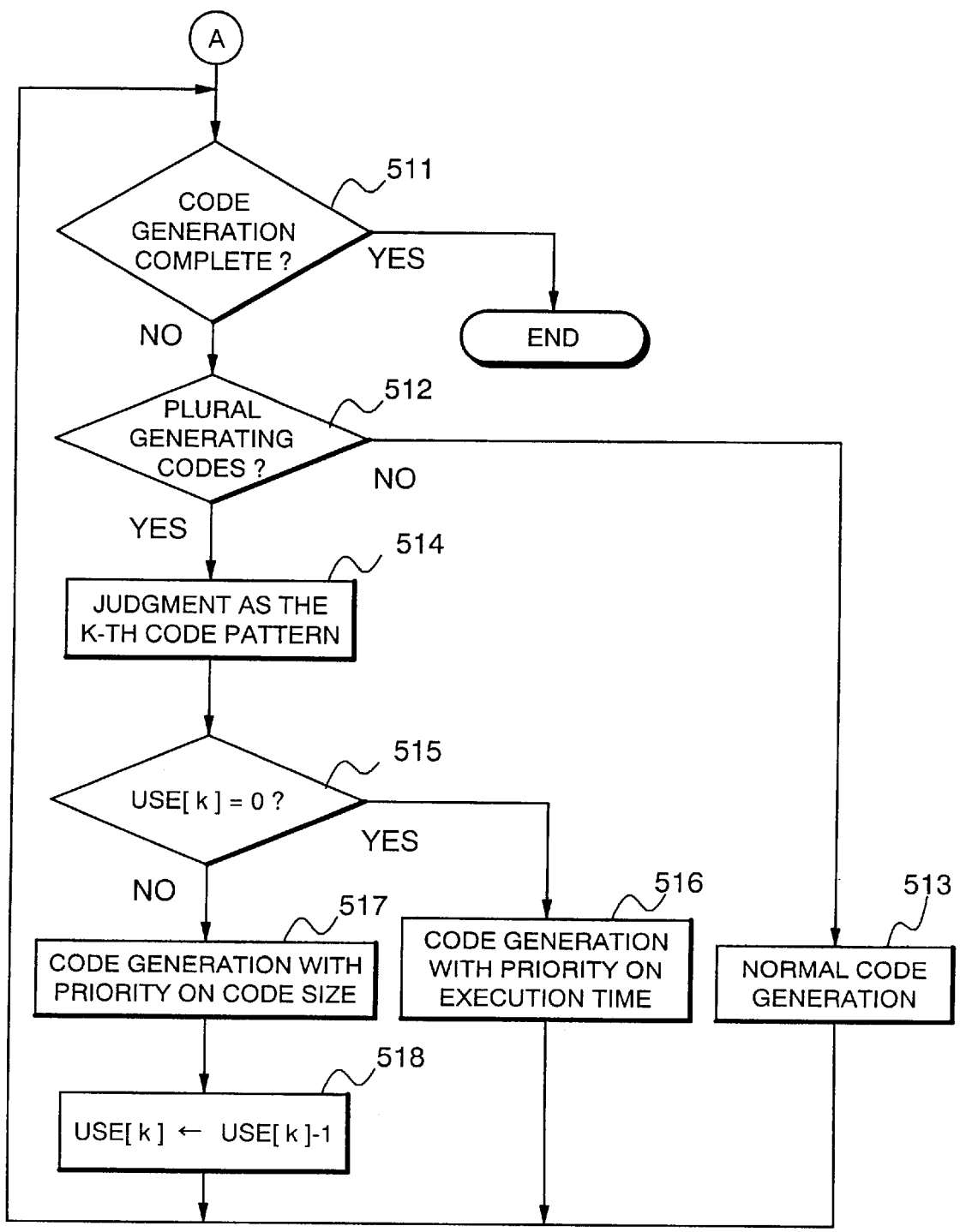
FIG. 7 is a flow chart showing actions from a code pattern selecting portion to a code generating portion by the second preferred embodiment under the present invention.
Figure 10:
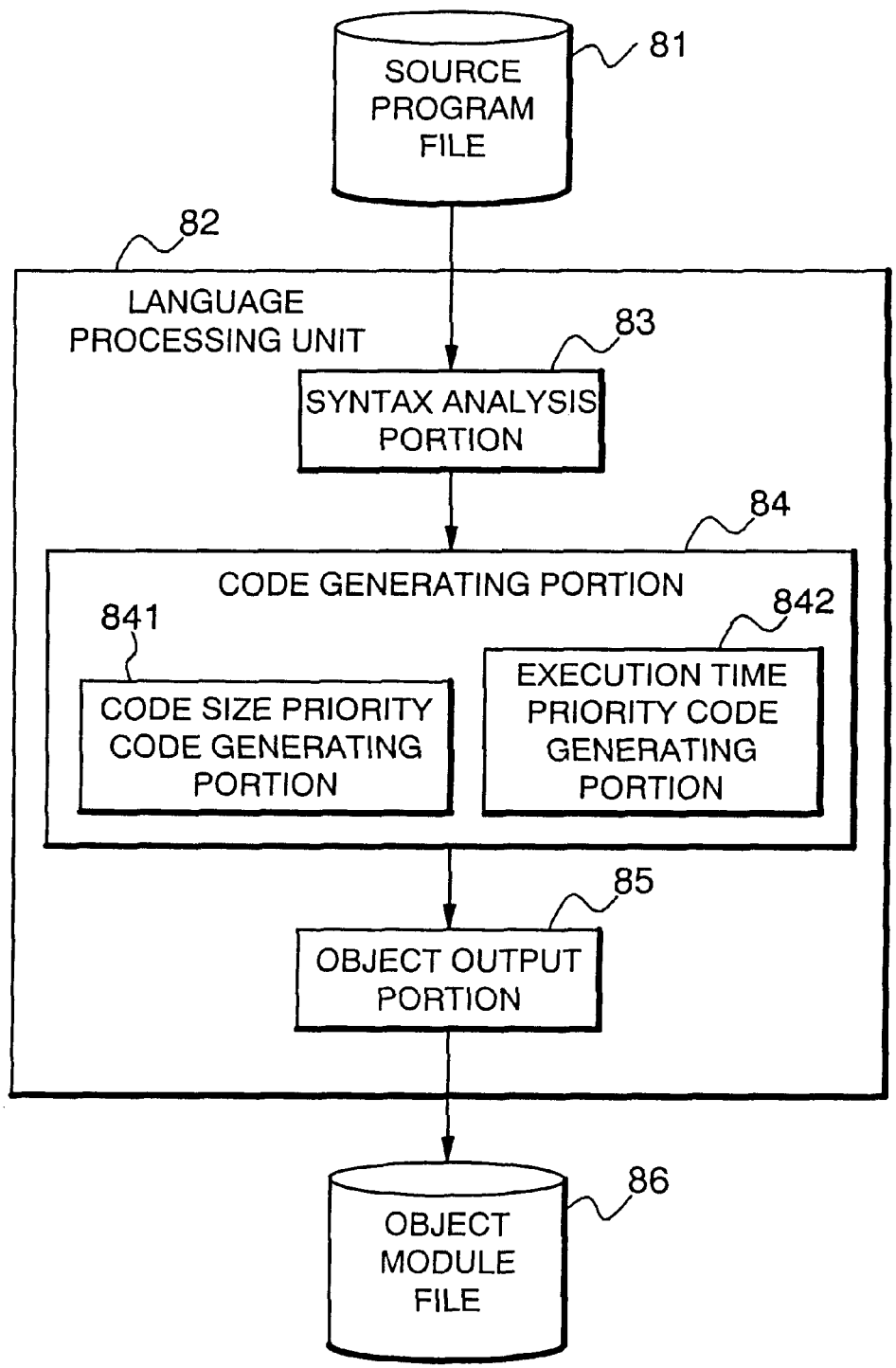
FIG. 10 is a block diagram showing a structure of the conventional language processing unit.
Figure 11:
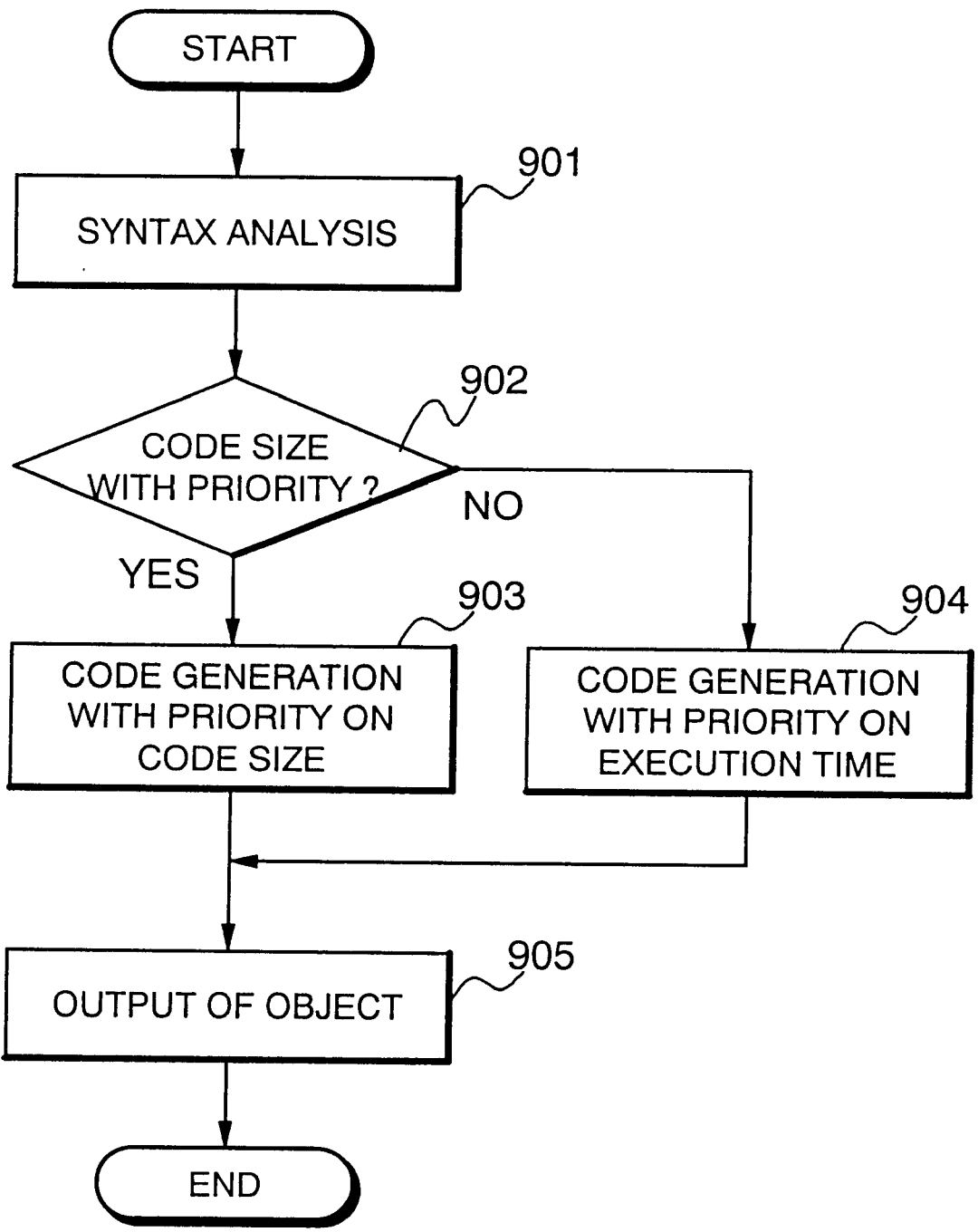
FIG. 11 is a flow chart showing actions of the conventional language processing unit.

After the completion of the processes up to the step 208, as for each code pattern registered in the code pattern registering portion 16, the areas on memory to represent the use frequency of the code pattern with priority on code size, USE[1], USE[2]. . . are initialized to "0" (FIG. 7, step 501). The USE[k] represents the use frequency of the code pattern with priority on code size, about the code pattern registered at the k-th of the code pattern registering portion 16.

After the completion of the initialization of the step 501, comparison is carried out on the code size designated by a programmer "USER" and the code size with priority on code size "CODE" (step 502). When the code size designated by a programmer "USER" is below the code size with priority on code size "CODE" the value of the use frequency "CNT[x]" (x is the registered number) of the code pattern is set to the use frequency "USE[x]" (x is the registered number) of the code pattern with priority on code size (step 503). With respect to the code pattern registered at the k-th of the code pattern registering portion 16, the value of the use frequency CNT[k] is set to the use frequency USE[k] of the code pattern with priority on code size. By setting in the step 503, the code generation with priority on all the code patterns is carried out by giving priority to the code size. After the completion of the process in the step 503, control is transferred to the code generating portion 17, and the code generation processing after the step 511 is carried out.

In the step 502, when the code size designated by a programmer "USER" is larger than the code size with priority on code size "CODE", the area on memory "i" to represent the registered number of the code pattern of the code pattern registering portion 16 is initialized into "1" (step 504), and the code size designated by a programmer "USER" is compared with the code size of an object module file "SIZE" to be output (step 505). When the code size designated by a programmer "USER" is over code size of an object module file "SIZE" to be output, control is transferred to the code generating portion 17, and the code generation processes in and after the step 511 are carried out.

In the step 505, the code size designated by a programmer "USER" is smaller than the code size of an object module file to be output "SIZE", comparison is made between the value obtained by subtracting the product of the code size difference D[i] registered at the i-th of the code pattern registering portion 16 and the use frequency CNT[i] from the code size of an object module file to be output "SIZE", and the code size of an object module file designated by a programmer "USER" (step 506). The value to be used in the step 506 "SIZE–D[i]×CNT[i]" is the codes size of an object module files to be output in the case when the code generation with priority on execution time is replaced with the code generation with priority on code size at all the portions where the i-th code pattern of the code pattern registering portion 16 is used.

In the step 506, the code size designated by a programmer "USER" is below "SIZE–D[i]×CNT[i]", as for the code pattern registered at the i-th of the code pattern registering portion 16, the value of the use frequency CNT[i] of code pattern is set to the use frequency CNT[i] of the code pattern with priority on code size (step 507), and the "SIZE–D[i]× CNT[i]" is reset to the code size of an object module file to be output "SIZE" (step 508). After the completion of the reset of the code size "SIZE" of an object module file to be output in the step 508, "1" is added to the contents of the registered number "i" of the code pattern of the code pattern registering portion 16 (step 509), and the procedure gets back to the step 505, and comparison is made between the code size designated by a programmer "USER" and the code size of an object module file reset and to be output "SIZE".

In the step 506, when the code size designated by a programmer "USER" is larger than the "SIZE–D[i]×CNT [i]", as for the code pattern registered at the i-th of the code pattern registering portion 16, such a use frequency of the code pattern with priority on code size is calculated so that it should be below the code size of an object module file to be output "USER", and is set to the USE[i] (step 510). The value to be set in the step 510 is the minimum integer value over (USER–SIZE)/D[i]. After the setting of the USE[i], control is transferred to the code generating portion 17, and the code generation processes in and after the step 511 are carried out.

In the code generating portion 17, it is judged whether the code generation is completed or not (FIG. 7, step 511). When the code generation is not completed, whether there are plural generating codes . . . or not (step 512). This is same as the conventional processing. When there is only one generating code, code generation is carried out in the same manner as the conventional method (step 513). When there are plural generating codes, the registration number of code patterns in the code pattern registering portion 16 is judged (step 514). The registered number of the code patter obtained in the step 514 is set as k.

As for the code pattern registered at the k-th of the code pattern registering portion 16, it is judged whether the use frequency USE[k] of the code pattern with priority on code size is "0" or not (step 515), and if the USE[k] is "0", control is transferred to the execution time priority code generating portion 172, and code generation is carried out by the code pattern with priority on execution time (step 516). If the USE[k] is not "0", control is transferred to the code size priority code generating portion 171, and code generation is carried out by the code pattern with priority on code size (step 517), and "1" is subtracted from the value of the USE[k] (step 518). After code generation at the step 513, step 516, or step 517, 518, the procedure gets back to the step 511, and whether the code generation is completed or not is judged, and if it is not completed, the next code generation is carried out. And after the completion of all the code generations, control is transferred to the object module file output portion 18, and an object module file 19 is output.

The above processing is explained now with a concrete example. FIG. 9 is one example of the registered contents of the code pattern registering portion 16. As shown in the figure, in this example, the unit of code size is set as byte, the unit of execution time is set as clock. The code pattern shown in the registered contents in FIG. 9 is same as that of the registered contents shown in FIG. 5, but code patterns that have little deterioration in execution time and are effective for the reduction of code size when they are replaced from code generation with priority on execution time to code generation with priority on code size are registered in order of priority. With respect to priority standard, the code pattern where the value obtained by subtracting the execution time difference C[x] (x is the registered number) from the code size difference D[x] (x is the registered number) is large has priority, and in the case of the same value, the code pattern where the execution time difference C[ ] is small has priority. The use frequencies of code pattern CNT[1], CNT[2], . . . are set in the step 204.

With respect to a specified source program file, from the measurement of the code size in the code size measuring portion 14, it is supposed that the code size of an object module file designated by a programmer "USER" is 1500 bytes, and the code size of an object module file in the case with priority on code size "CODE" is 1200 bytes, and the code size of an object module file in the case with priority on execution time "SPEED" is 1600 bytes. And it is supposed that the use frequency of the code pattern registered in the code pattern registering portion 16 CNT[x] (x is the registered number) is 52 times, 68 times, 40 times, 22 times, 26 times, and 34 times in the order of registered number.

In the step 208, the code size of an object module file to be output "SIZE" is set to 1600 bytes in the same manner as the code size of the object module file in the case with priority on execution time "SPEED".

In the step 501, all the use frequencies USE[x] (x is the registered number) of the code pattern with priority on code size are initialized to "0".

In the comparison of the code size "USER" (1500 bytes) and the code size "CODE" (1200 bytes) in the step 502, the code size "USER" is larger than the code size "CODE", so the procedure gets to the step 504, and the area on memory "i" to represent the registered number of the code pattern of the code pattern registering portion 16 is initialized into "1".

In the comparison of the code size "USER" (1500 bytes) and the code size "SIZE" (1600 bytes) in the step 505, the code size "USER" is smaller than the code size "SIZE", so processing is transferred to the step 506. From FIG. 9, the code size difference D[1] is 2 bytes, and the code pattern use frequency CNT[1] is 52 times, so in the step 506, comparison is carried out between the code size "USER" (1500 bytes) and the code size "SIZE−D[1]×CNT[1]" (1600−2× 52) bytes).

The code size "USER" is larger than the code size "SIZE−D[1]×CNT[1]", so the processing is transferred to the step 510, wherein the minimum integer value over (USER−SIZE)/D[1] is set to the USE[1]. Since (1600− 1500)/2=50, 50 is set to the USE[1]. Namely, among the 52 times of the use frequency of the code pattern registered at the first, for 50 times, the code generation with priority on code size is carried out, and for the remaining 2 times, the code generation with priority on execution time is carried out.

When the code generation about the first code pattern, the processing is transferred to the step 517 until the value of the USE[1] becomes "0", and the code generation with priority on code size is carried out, and in the step 518, "1" is subtracted from the value of the USE[1]. When the value of the USE[1] becomes "0", the processing is transferred to the step 516, and the code generation with priority on execution time is carried out. As for the code pattern in and after the second, since the value of the USE[x] (x is the registered number) is "0", the processing is transferred to the step 516, and the code generation with priority on execution time is carried out. And after the completion of all the code generations, an object module file is output.

The code size of the output object module file becomes 1500 bytes, which meets the condition the code size of an object module file that a programmer wants should be below 1500 bytes. And since the code pattern with priority on execution time is included, the execution time becomes shorter than an object module file in the case with priority on code size. And further, the replacement to restrict the deterioration in execution time, the execution time becomes shorter than the first preferred embodiment.

As described above, in the present invention, the code size in the case with priority on code size and the use frequency of the registered code pattern, and the code size in the case with priority on execution time are measured, and part or the whole of the generating codes in the case with priority on execution time is replaced with the generating codes in the case with priority on code size until they are stored within the code size designated by a programmer, and an object module file is output. Accordingly, it is possible to generate a code at an optional size between the conventional generating code with priority on code size and the generating code with priority on execution time, as a result, it is possible to output an object module file with a short execution time within the code size designated by a programmer.

As described heretofore, according to a language processing unit and a language processing method under the present invention, there is an effect that it is possible to restrict the deterioration in execution time and adjust the code size of an object module file by replacing part of the code generations with priority on execution time, and thereby to shorten the code size.

Thereby, there is other effect that it is possible to remove the trouble for a programmer to rewrite an object module file and adjust the code size of an object module file when an object module file that has carried out the code generation with priority on execution time should not be stored within the code size desired by a programmer.

And moreover, there is a further effect that it is possible to improve the execution time by adjusting the code size of an object module file, so an object module file that has carried out the code generation with priority on code size becomes far smaller than the code size desired by a programmer, it is possible to generate an object module file with a shorter execution time by increasing the code size of an object module file up to the code size that a programmer wants.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processing unit for translating a source program into an object module file, comprising:

syntax analysis means for inputting and analyzing a source program;

code pattern registering means for registering code generation methods and code size differences about different code patterns in the case of generating code to put priority on making the size of an object module file small, and in the case of generating code to put priority on making the execution time short, wherein the source program is analyzed and divided into one or more different code patterns which can be repeatedly executed a number of times during execution of the source program;

code size measuring means for measuring the size of an object module file in the case of code generation with priority on making the size of an object module file small, and the size of an object module file in the case of code generation with priority on making the execution time short, to an analysis results by said syntax analysis means, and counting the number of times of usage of each code pattern of said output codes registered in said code pattern registering means in generated operation codes;

code pattern selecting means for replacing part or the whole of said generating code with priority on the execution time of an object module file with generating codes with priority on the size of an object module file so that they should be stored within the code size of an object module file designated by a programmer in reference to the measurement results of said code size measuring means and said registered contents of said code pattern registering means;

code generation means for generating an operation code to an analysis results by said syntax analysis means, in accordance with said selection results of said code pattern selecting means; and object module file output means for outputting said operation code generated by said code generation means as an object module file.

2. A language processing unit as set forth in claim 1, wherein said code pattern registering means registers code patterns in the order so as to restrict deterioration in the execution time of an object module file and make the size of an object module file smaller.

3. A language processing unit as set forth in claim 1, wherein said code pattern selecting means decides the times of code generation with priority on the size of an object module file, among the use frequencies of each code pattern.

4. A language processing unit as set forth in claim 1, wherein said code pattern registering means registers code patterns in the order so as to restrict the deterioration in the execution time of an object module file and make the size of an object module file smaller; and said code pattern selecting means decides the times of code generation with priority on the size of an object module file, among the use frequencies of each code pattern.

5. A language processing method for translating a source program into an object module file, comprising the steps of:

inputting and analyzing a source program, wherein the source program is analyzed and divided into one or more different code patterns which can be repeatedly executed a number of times during execution of the source program;

measuring the size of an object module file in the case of code generation with priority on making the size of an object mobile file small, and the size of an object module file in the case of code generation with priority on making the execution time short, to an analysis results by said source programs analysis step, and counting the number of times of usage of each code pattern of said output codes registered among generated operation codes;

selectively replacing part of the whole of said generating codes with priority on the execution time of an object module file with said generating codes with priority on the size of an object module file so that they should be stored within the code size of an object module file designated by a programmer in reference to the measurement results of said code size measuring step and said respective code generation methods and the data on code generation that are accumulated about different code patterns in the case with priority on making the size of an object module file small and in the case with priority on making the execution time of an object module file short;

generating an operation code to said program analyzed by said source program analysis step according to said selection results by said generating code selection step; and outputting said operation code generated by said operation code generation step as an object module file.

6. A language processing method as set forth in claim 5, wherein said generating code selecting step refers the data accumulated on said code pattern in the order so as to restrict deterioration in the execution time of an object module file and make the size of an object module file smaller.

7. A language processing method as set forth in claim 5, wherein said generating code selecting step decides the times of the code generation with priority on the size of an object module file, among the use frequencies of each code pattern.

8. A language processing method as set forth in claim 5, wherein said generating code selecting step refers the data accumulated on said code pattern in the order so as to restrict deterioration in the execution time of an object module file and make the size of an object module file smaller; and said generating code selecting step decides the times of the code generation with priority on the size of an object module file, among the use frequencies of each code pattern.

9. A computer readable memory having a language processing program to control a language processing unit to translate a source program into an object module file, and said language processing program comprising the steps of:

inputting and analyzing a source program, wherein the source program is analyzed and divided into one or more different code patterns which can be repeatedly executed a number of times during execution of the source program;

measuring the size of an object module file in the case of code generation with priority on making the size of an object mobile file small, and the size of an object module file in the case of code generation with priority on making the execution time short, to an analysis results by said source program analysis step, and counting the number of times of usage of each code pattern of said output codes registered among generated operation codes;

selectively replacing part of the whole of said generating codes with priority on the execution time of an object module file with said generating codes with priority on the size of an object module file so that they should be stored within the code size of an object module file designated by a programmer in reference to respective code generation methods and the data on code generation that are accumulated about different code patterns in the case with priority on making the size of an object module file small and in the case with priority on making the execution time of an object module file short;

generating an operation code to the program analyzed by said source program analysis step according to the selection results by said generating code selection step; and outputting the operation code generated by said operation code generation step as an object module file.

10. A computer readable memory as set forth in claim 9, wherein said generating code selecting step in said language processing program refers the data accumulated on said code pattern in the order so as to restrict the deterioration in the execution time of an object module file and make the size of an object module file smaller.

11. A computer readable memory as set forth in claim 9, wherein said generating code selecting step in said language processing program decides the times of the code generation with priority on the size of an object module file, among the use frequencies of each code pattern.

12. A computer readable memory as set forth in claim 9, wherein said generating code selecting step in said language processing program refers the data accumulated on said code pattern in the order so as to restrict the deterioration in the execution time of an object module file and make the size of an object module file smaller; and said generating code selecting step decides the times of the code generation with priority on the size of an object module file, among the use frequencies of each code pattern.

* * * * *

UNITED STATES PATENT AND TRADEMARK OFFICE
CERTIFICATE OF CORRECTION

PATENT NO. : 6,014,519
DATED : January 11, 2000
INVENTOR(S) : Roh Egashira

It is certified that error appears in the above-identified patent and that said Letters Patent is hereby corrected as shown below:

Column 7, Lines 55-56: "FLAG in the Step 209, the FLAG " should read

--FLAG [x] (x is the registered number) in the Step 209, the FLAG [x]

(x is the registered number)--

Column 7, Lines 60-61: "FLAG in the Step 209,..." should read --FLAG [x]

(x is the registered number) in the Step 209,...--

Column 9, Line 24: ""ESIZE"" should read --"SIZE"--

Column 10, Line 9: "1-3" should read --1~3--

Column 10, Line 10: "FLAGS to the..." should read --FLAG [x]

( x is the registered number) to the--

Column 10, Line 28: "FLAG is up" should read --FLAG [x] (x is the registered number) is up--

Column 11, Line 9: "...number). that..." should read --...number) that...--

UNITED STATES PATENT AND TRADEMARK OFFICE
CERTIFICATE OF CORRECTION

PATENT NO. : 6,014,519
DATED : January 11, 2000
INVENTOR(S) : Roh Egashira

It is certified that error appears in the above-identified patent and that said Letters Patent is hereby corrected as shown below:

Column 13, Line 36: "C is..." should read --C[x] (x is the registered number) is...--

Signed and Sealed this

Twenty-third Day of January, 2001

Attest:

Q. TODD DICKINSON

Attesting Officer

Commissioner of Patents and Trademarks